(12) United States Patent
Warkentin et al.

(10) Patent No.: US 10,776,287 B2
(45) Date of Patent: Sep. 15, 2020

(54) HEADLESS SUPPORT USING SERIAL-BASED VIRTUAL CONSOLES IN A COMPUTING SYSTEM

(71) Applicant: VMware, Inc., Palo Alto, CA (US)

(72) Inventors: Andrei Warkentin, North Andover, MA (US); Cyprien Laplace, Boston, MA (US); Ye Li, Newton Highlands, MA (US); Alexander Fainkichen, Southborough, MA (US); Regis Duchesne, Monts-de-Corsier (CH)

(73) Assignee: VMware, Inc., Palo Alto, CA (US)

( * ) Notice: Subject to any disclaimer, the term of this patent is extended or adjusted under 35 U.S.C. 154(b) by 80 days.

(21) Appl. No.: 15/898,714

(22) Filed: Feb. 19, 2018

(65) Prior Publication Data
US 2019/0258590 A1 Aug. 22, 2019

(51) Int. Cl.
*G06F 13/10* (2006.01)
*G06F 9/455* (2018.01)
*G06T 11/00* (2006.01)

(52) U.S. Cl.
CPC ........ *G06F 13/102* (2013.01); *G06F 9/45504* (2013.01); *G06T 11/001* (2013.01)

(58) Field of Classification Search
CPC ... G06F 9/45504; G06F 13/102; G06T 11/001
See application file for complete search history.

(56) References Cited

U.S. PATENT DOCUMENTS

| 6,701,360 | B1 * | 3/2004 | Diesing | H04L 29/06 709/223 |
| 7,392,172 | B2 * | 6/2008 | Rostampour | G06F 9/45504 703/25 |
| 2002/0156873 | A1 * | 10/2002 | Wilson | G06F 9/451 709/220 |
| 2003/0126226 | A1 * | 7/2003 | Ramey | H04L 45/00 709/215 |
| 2003/0142111 | A1 * | 7/2003 | Emerson | G06F 3/1454 345/600 |
| 2016/0170786 | A1 * | 6/2016 | Gulam | G06F 9/45533 713/2 |

* cited by examiner

*Primary Examiner* — Nimesh G Patel
(74) *Attorney, Agent, or Firm* — Patterson + Sheridan, LLP

(57) ABSTRACT

An example method of accessing a computing system includes: providing serial terminal driver configured to interface a serial port in a hardware platform of the computer system; providing a console object configured to communicate with an operating system (OS) in a software platform of the computer system and the serial terminal driver; connecting to the console object through the serial port via a computer terminal; sending text and commands from the console object to the computer terminal; and rendering, by the computer terminal, a console for presentation on a display of the computer terminal.

20 Claims, 5 Drawing Sheets

US 10,776,287 B2

HEADLESS SUPPORT USING SERIAL-BASED VIRTUAL CONSOLES IN A COMPUTING SYSTEM

BACKGROUND

Many operating systems have the concept of an operator/administrator console. Operating systems with a text-based interface on personal computers and servers typically implement the text-based operator/administrator consoles via keyboard input and built-in video. The operator/administrator console facilities include support for what is known as "virtual consoles," which can be switched via a hot-key and provide concurrent separate login sessions into the system. Additionally, the console may be switched into a "kernel console," which allows interactive access to all kernel log messages or to be put into a special live debugging mode to dump kernel and system information. In some cases, the same console output can be used for a crash debugger and/or for panic screen interactions.

One problem is that some servers have no "built-in" console support because these servers lack a video card/controller. The only way to interface with the operating system (OS) on these "headless" systems is through the serial port. There is usually only one serial port on such headless systems. Although the OS supports operation via a single serial console, the experience is different from the traditional keyboard and video consoles. There is no support for virtual consoles, meaning that there can only be one logical login session running. Also, there is limited support for kernel interaction (e.g., there is no interactive kernel logging console, no interactive panic screen, and no live debugging support). Further, the user interface for headless systems is wholly different, with a mixture of boot options and tricks that administrators need to learn to only get a partial feature set as compared to the traditional keyboard and video consoles.

SUMMARY

Techniques for headless support using serial-based virtual consoles in a computing system are described. In an embodiment, a method of accessing a computing system includes: providing serial terminal driver configured to interface a serial port in a hardware platform of the computer system; providing a console object configured to communicate with an operating system (OS) in a software platform of the computer system and the serial terminal driver; connecting to the console object through the serial port via a computer terminal; sending text and commands from the console object to the computer terminal; and rendering, by the computer terminal, a console for presentation on a display of computer terminal.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
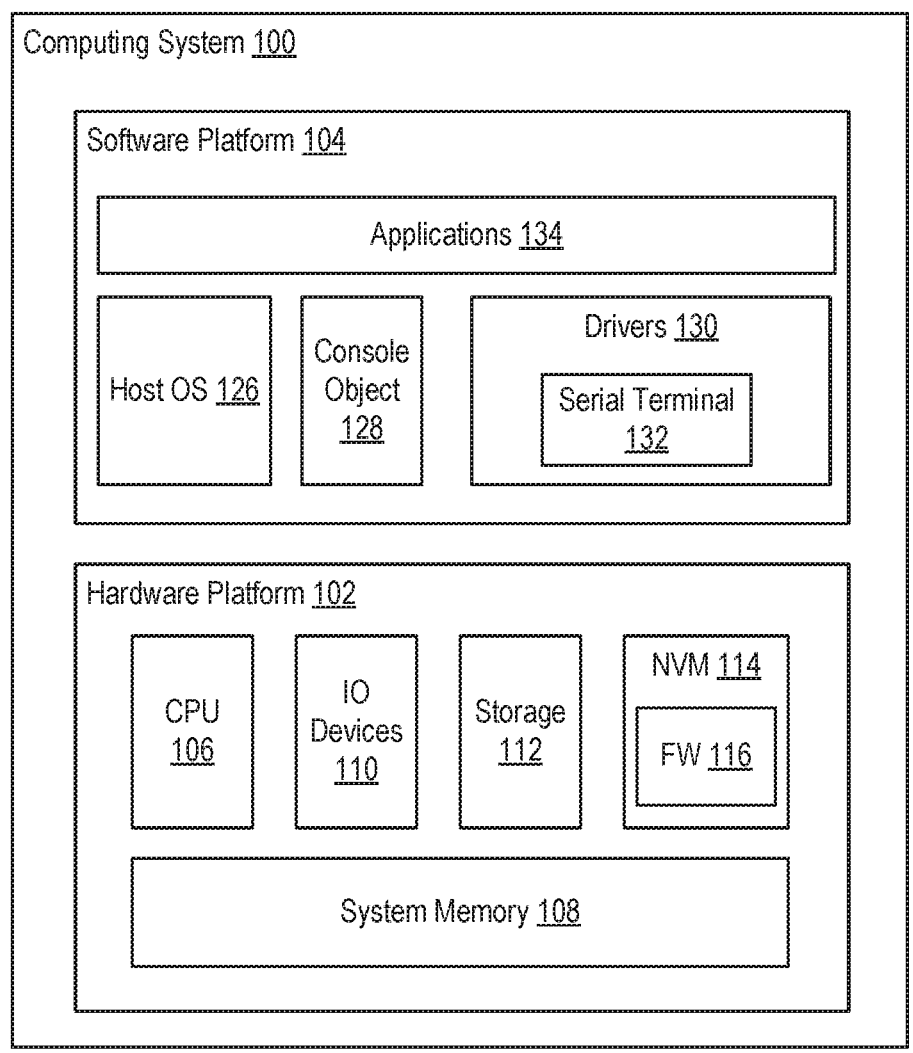
FIG. 1 is a block diagram depicting a computing system according to an embodiment.

FIG. 1 is a block diagram depicting a computing system 100 according to an embodiment. Computing system 100 includes a software platform 104 executing on a hardware platform 102. Hardware platform 102 may include conventional components of a computing device, such as a central processing unit (CPU) 106, a system memory 108, input/output (IO) devices 110, storage devices ("storage 112"), and non-volatile memory (NVM) 114. CPU 106 is configured to execute instructions, for example, executable instructions that perform one or more operations described herein and may be stored in system memory 108 and storage 112. System memory 108 is a device allowing information, such as executable instructions and data, to be stored and retrieved. System memory 108 may include, for example, one or more random access memory (RAM) modules.

CPU 108 includes one or more cores, each being a microprocessor or like type processor element. The each core of CPU 108 can be any type of general-purpose central processing unit (CPU), such as an x86-based processor, ARM®-based processor, or the like. CPU 108 can include other support circuitry, such as cache memories, memory management units (MMUs), interrupt controllers, north bridge, south bridge, platform host controller, voltage regulators, firmware, and the like. Storage 112 includes local storage devices (e.g., one or more hard disks, flash memory modules, solid state disks, and optical disks) and/or a storage interface that enables computing system 100 to communicate with one or more network data storage systems. Examples of a storage interface are a host bus adapter (HBA) that couples computing system 100 to one or more storage arrays, such as a storage area network (SAN) or a network-attached storage (NAS), as well as other network data storage systems. IO devices 110 include conventional interfaces known in the art, such as one or more network interfaces, universal serial bus (USB) interfaces, Inter-Integrated Circuit (I²C) interfaces, serial peripheral interface (SPI) interfaces, 1-wire interfaces, general purpose input/output (GPIO) interfaces, and the like. NVM 114 is a device allowing information to be stored persistently regardless of the state of power applied to computing system 100 (e.g., FLASH memory or the like). NVM 114 stores firmware (FW) 116 for computing system 100, such as a Basic Input/Output System (BIOS), Unified Extensible Firmware Interface (UEFI), or the like.

Software platform 104 includes a host operating system (OS) 126, a console object 128, drivers 130, and applications 134. Host OS 126 cooperates with drivers 130 to manage hardware platform 102. Host OS 126 also manages applications 134. Host OS 126 can be any commodity operating system known in the art, such as such as Linux®, Microsoft Windows®, Mac OS®, or the like.

At power-on of computing system 100, firmware 116 performs initialization of hardware platform 102. Firmware 116 is compliant with a version of the ACPI specification. The ACPI specification provides a register set and software framework that enables power management and system configuration without the need for a direct interface between host OS 126 and firmware 116. Firmware 116 hands off execution to host OS 126 (e.g., a bootloader of host OS 126). The bootloader loads host OS 126 into system memory 108 and performs initialization of host OS 126.

Drivers 130 include a serial terminal 132. Serial terminal 132 provides access to a serial port in IO devices 110. The console object 128 is backed by serial terminal 132. This allows a terminal emulator to be connected to the serial port and render console support as would be present on a non-headless machine. Operation of console object 128 is described further below.

Figure 2:
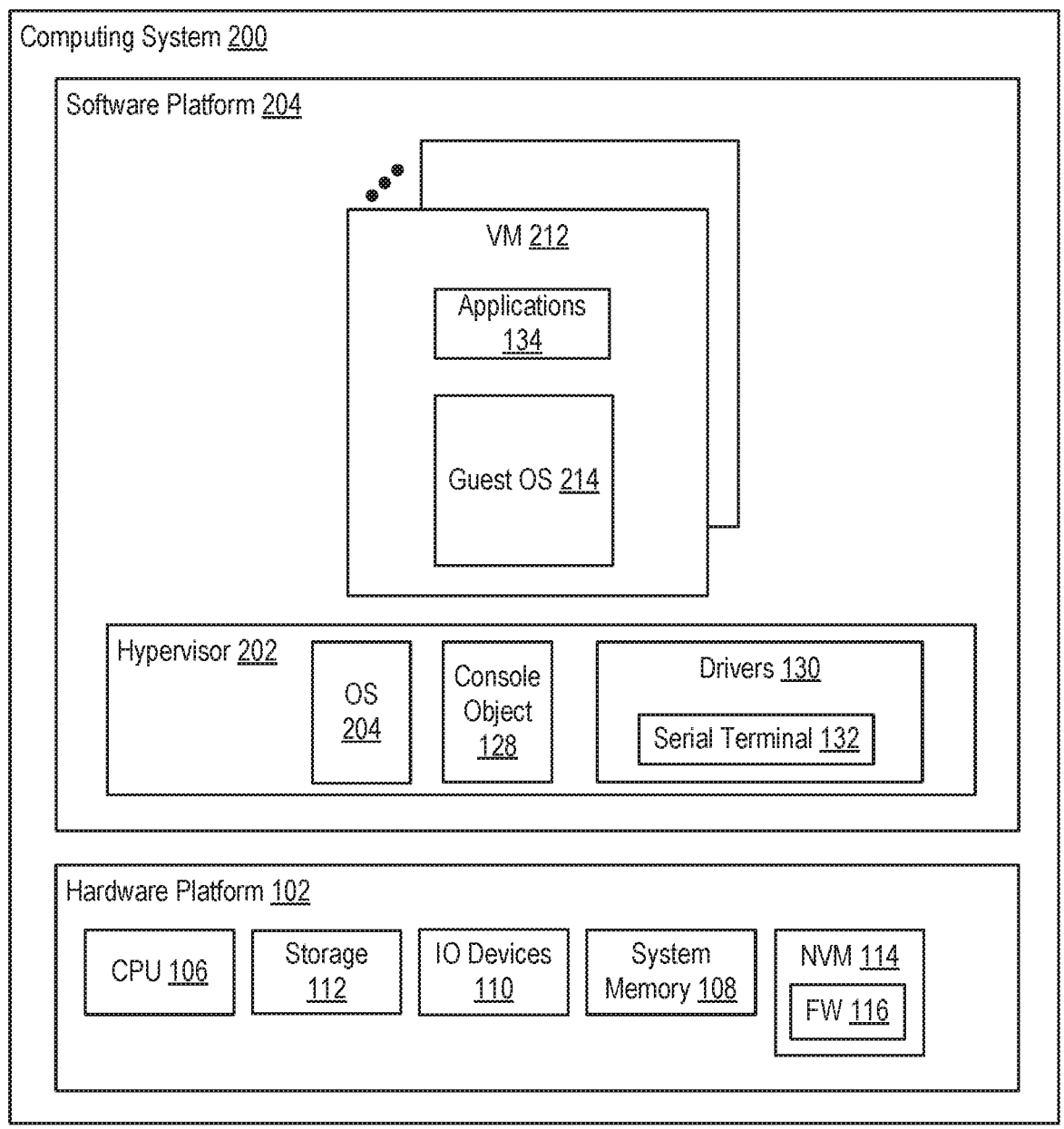
FIG. 2 is a block diagram depicting a virtualized computing system according to an embodiment.

FIG. 2 is a block diagram depicting a virtualized computing system 200 according to an embodiment. Elements of FIG. 2 that are the same or similar to those of FIG. 1 are designated with identical reference numerals. Virtualized computing system 100 includes hardware platform 102 and a software platform 204. Hardware platform 102 is configured as described above. Software platform 204 includes a virtualization layer that abstracts processor, memory, storage, and networking resources of hardware platform 102 into one or more virtual machines ("VMs") 212 that run concurrently on virtualized computing system 200. VMs 212 run on top of the virtualization layer, referred to herein as a hypervisor 202, which enables sharing of the hardware resources by VMs 212. One example of hypervisor 202 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein).

Each VM 212 supported by hypervisor 202 includes guest software (also referred to as guest code) that runs on the virtualized resources supported by hardware platform 102. In the example shown, the guest software of each VM 212 includes a guest OS 214 and applications 134. Guest OS 134 can be any commodity operating system known in the art, such as such as Linux®, Microsoft Windows®, Mac OS®, or the like. Guest OS 214 functions similarly to host OS 126, but on virtualized hardware rather than the physical hardware of hardware platform 102.

Hypervisor 202 includes, among other components, an OS 204, console object 128, and drivers 130. OS 204 provides operating system functionality (e.g., process creation and control, file system, process threads, etc.), as well as CPU scheduling and memory scheduling. VMMs 206 implement the virtual system support needed to coordinate operations between hypervisor 202 and VMs 212. Console object 128 and drivers 130 function similarly as for the system 100.

Returning to FIG. 1, in an embodiment, host OS 126 can be replaced by a hypervisor (e.g., hypervisor 202). Hypervisor 202 is also an operating system that is specialized for virtualization. However, hypervisor 202 can perform similar functions as host OS 126.

Figure 3:
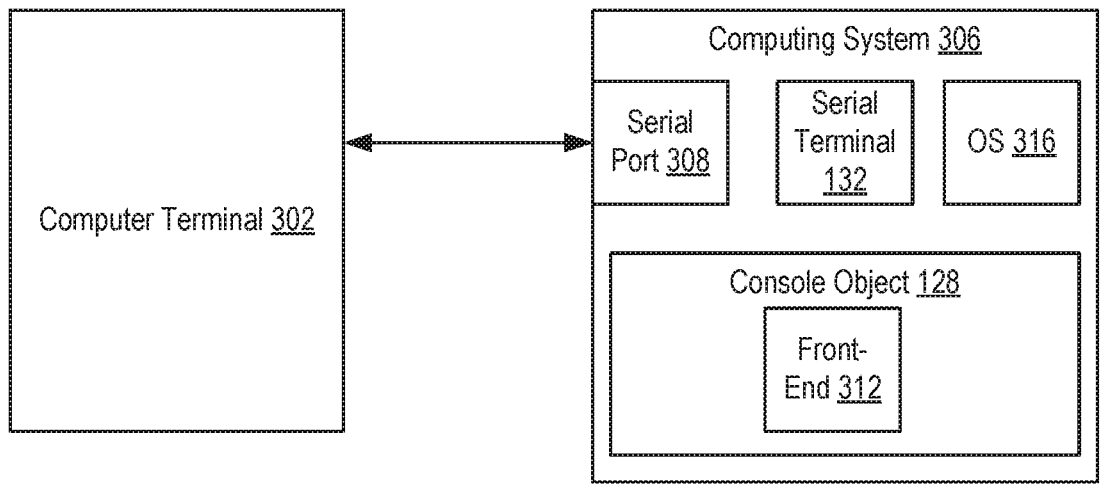
FIG. 3 is a block diagram depicting a computing system coupled to another computing system according to an example.

FIG. 3 is a block diagram depicting a computer terminal 302 coupled to a computing system 306 according to an example. Computer terminal 302 is a hardware device that includes a keyboard and a display, or a terminal emulator executing on a computer, which also connected to a keyboard and a display. Computer terminal 302 is configured to render a console for presentation on a display. The console provides a textual user interface (UI) through which a user can interact at the computer terminal 302. Computing system 306 includes a serial port 308, serial terminal 132, an OS 316, and console object 128. Computing system 302 is coupled to computer terminal 306 through serial port 308. OS 316 can be a host OS (e.g., host OS 126) or an OS in a hypervisor (OS 204). Serial terminal 132 and console 128 are discussed above. Console object 128 includes a front-end interface ("front-end 312") configured for communication with the OS 316. Console object 128 communicates with the serial terminal 132, which provides a back-end interface for the console object 128. Front-end 312 provides input methods for console object 128. In such case, OS 316 does not have to rely on a higher-level terminal object or the like.

Figure 4:
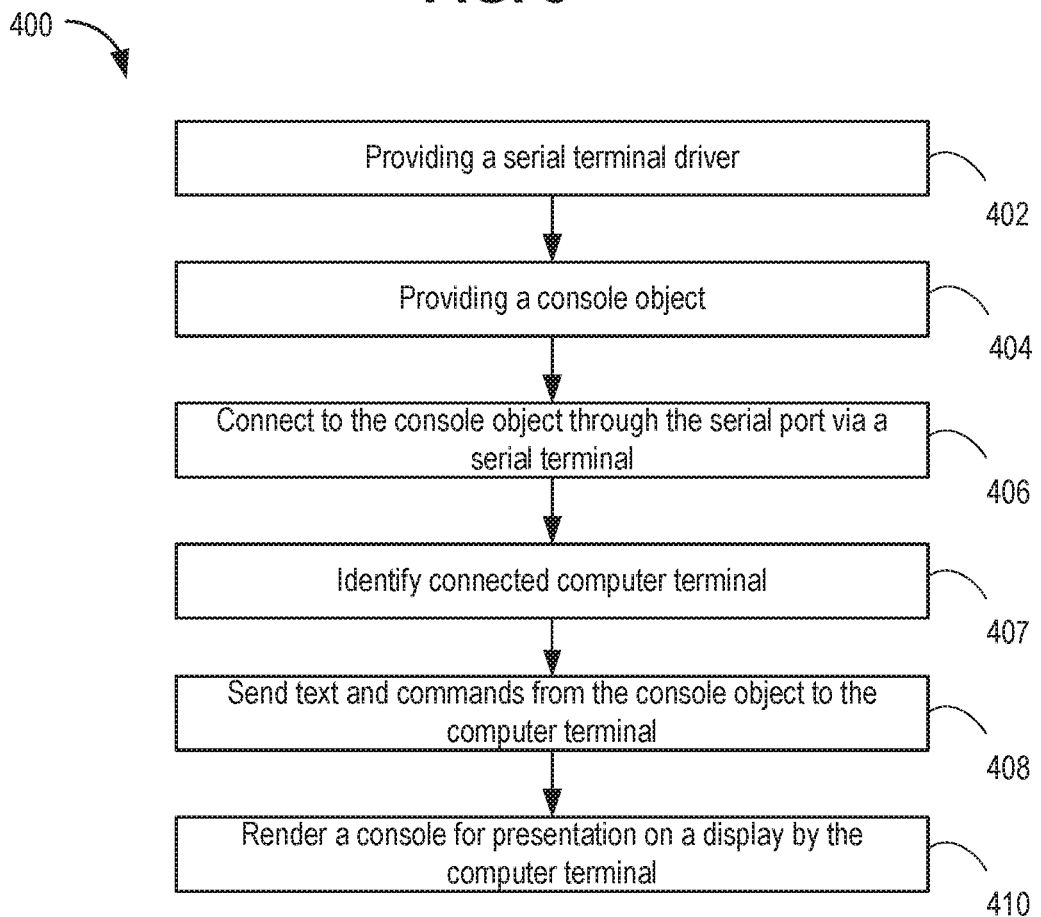
FIG. 4 is a flow diagram depicting a method of accessing a computing system according to an example.

FIG. 4 is a flow diagram depicting a method of accessing a computing system according to an example. Method 400 begins at step 402, where computing system 306 provides a serial terminal driver 132. At step 404, computing system 306 provides console object 128. At step 406, computer terminal 302 connects to console object 128 through serial port 308 via serial terminal 132. At step 407, serial terminal 132 attempts to identify terminal emulator 304. Serial terminal 132 can identify terminal emulator in order to determine how characters should be sent. In an embodiment, serial terminal 132 can identify terminal emulator using an ENQ command. At step 408, console object 128 sends text and commands to computer terminal 302. Examples for sending characters and commands are described below. At step 410, computer terminal 302 renders a console for presentation on display 310.

Figure 5:
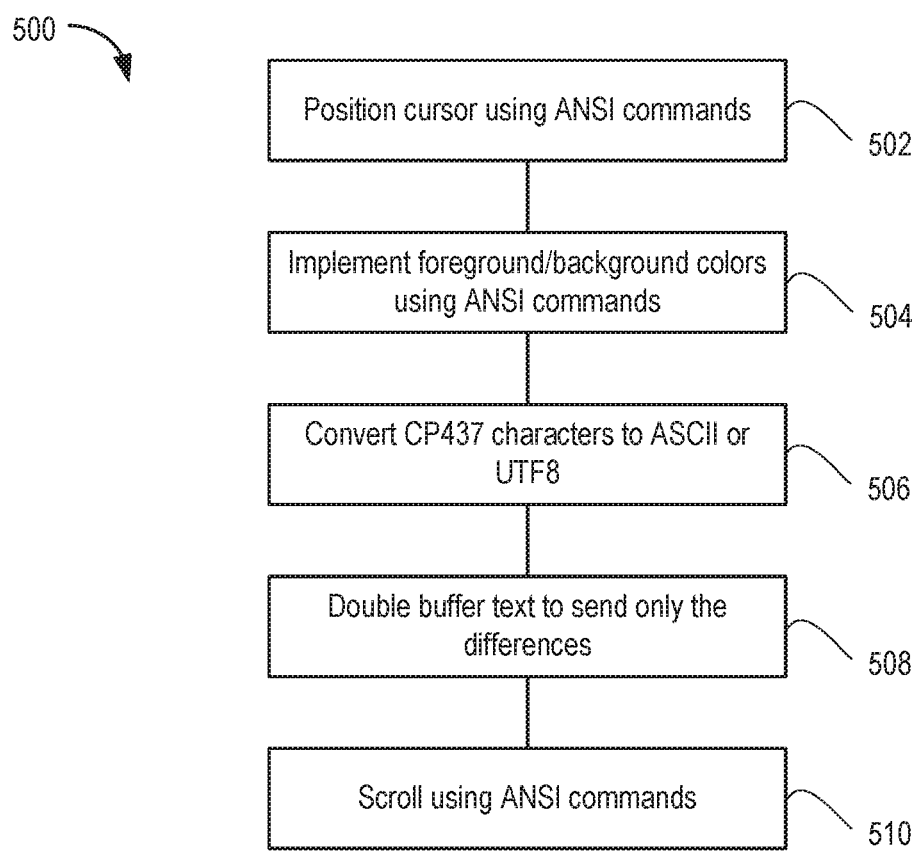
FIG. 5 is a flow diagram depicting a method of sending text and commands by a console object according to an embodiment.

FIG. 5 is a flow diagram depicting a method 500 sending text and commands by console object 128 according to an embodiment. Method 500 begins at step 502, where console object 128 positions cursor using one or more American National Standards Institute (ANSI) commands (e.g., escape code commands). At step 504, console object 128 implements foreground/background colors using one or more ANSI commands. At step 506, console object 128 converts CP437 characters to ASCII or UTF8. Unlike console object implementations for a video driver, there is no need to convert to the Video Graphics Array (VGA) format. In an embodiment, console object 128 accepts CP437 characters from OS 316 (or any other external component). Code page 437 (CP437) is the character set of the original IBM PC and includes ASCII codes 32-126, extended codes for accented letters, some Greek letters, icons, and line-drawing symbols. CP437 is sometimes referred to as "extended ASCII." Depending on capabilities of terminal emulator 304 (e.g., as identified in step 407), console object 128 converts CP437 characters to pure ASCII or pure UTF8. Most terminal emulators cannot display CP437 characters correctly without further configuration.

At step 508, console object 128 double buffers the text to be sent over the serial port to send only the differences. This provides for "fast printing." For example, if position (100, 20) already contains an 'A', console 128 does not resend the character. At step 510, console object 128 scrolls using one or more ANSI commands (e.g., fast scrolling, not re-rendering the entire screen).

Console object 128 is constructed and instantiated when OS 126 detects a headless system, as queried from FW 116 or as indicated by a special boot option. At the kernel interface level, console object 128 appears as non-headless operation. Console object 128 can be used to present a boot screen with boot progress. In some cases the boot screen is disabled, but early logging is enabled. Console object 128 can be used to present the early logging messages. Console object 128 is switchable in the same way as on non-headless systems (e.g., via function keys), with actual re-rendering of the screen contents for each switch. In an embodiment, hypervisor 202 includes a direct console user interface (DCUI) running as a virtual console, shell sessions optionally on their virtual consoles, kernel console with a kernel debugger and/or interactive logger. Console object 128 can be used to present one or more of these virtual consoles of hypervisor 202.

Figure 6:
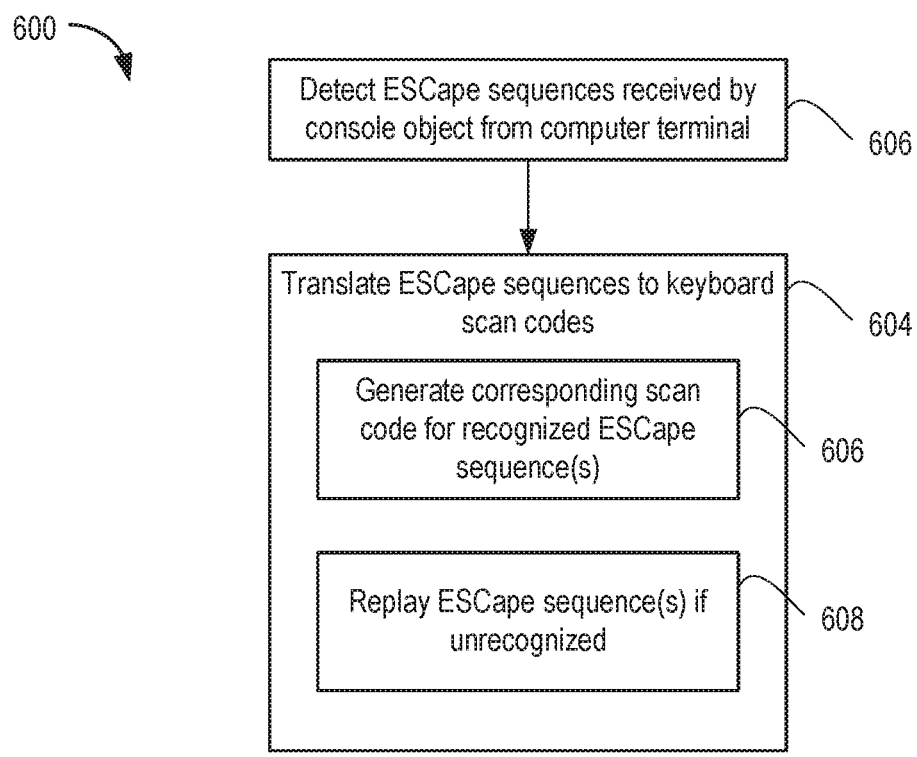
FIG. 6 is a flow diagram depicting a method of processing characters input to console object according to an embodiment.

FIG. 6 is a flow diagram depicting a method 600 of processing characters input to console object 128 according to an embodiment. Method 600 begins at step 602, where console object 128 detects ESCape sequences received from computer terminal 302. An "escape sequence" or ESCape sequence is a series of characters used to change the state of a computer and connected peripheral devices. ESCape sequences are also referred to as control sequences. At step 604, console object translates the ESCape sequences to keyboard scan codes. A keyboard scan code is the data that a keyboard sends to a computer to report which keys have been pressed. A number or sequence of numbers is assigned to each key on a keyboard. Notably, console object 128 matches and converts certain (e.g., non-alphanumeric) character sequences into keyboard scan codes expected by terminal emulator 304. For example, shift-Fn can be converted into ALT-Fn. This allows console object 128 to switch virtual terminals, detect arrow keys, detect delete keys, and the like. Step 604 can include step 606, where console object 128 generates a corresponding keyboard scan code for each recognized ESCape sequence. At step 606, console object 128 replays any ESCape sequence that is unrecognized (e.g., a single <ESC> is received).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of accessing a computing system, comprising:
   providing serial terminal driver configured to interface a serial port in a hardware platform of the computer system;
   providing a console object configured to communicate with an operating system (OS) in a software platform of the computer system and the serial terminal driver;
   connecting to the console object through the serial port via a computer terminal, the console object providing a textual user interface (UI) of a console for interaction at the computer terminal;
   sending text and commands from the console object to the computer terminal; and
   rendering, by the computer terminal based on the text and the commands, the textual UI of the console for presentation on a display of the computer terminal.

2. The method of claim 1, wherein the step of sending comprises:
   positioning a cursor using one or more American National Standards Institute (ANSI) commands.

3. The method of claim 1, wherein the step of sending comprises:
   implementing at least one foreground or background color using one or more American National Standards Institute (ANSI) commands.

4. The method of claim 1, wherein the step of sending comprises:
   identifying the terminal emulator at the console object; and
   converting CP437 characters to ASCII characters or UTF8 characters depending on capabilities of the computer terminal.

5. The method of claim 1, wherein the step of sending comprises:
   double-buffering text to send only differences thereof.

6. The method of claim 1, wherein the step of sending comprises:
   scrolling using one or more American National Standards Institute (ANSI) commands.

7. The method of claim 1, further comprising:
   detecting escape sequences received by the console object; and
   translating each of one or more of the escape sequences to a keyboard scan code.

8. A non-transitory computer readable medium having instructions stored thereon that when executed by a processor cause the processor to perform a method of providing serial terminal driver configured to interface a serial port in a hardware platform of the computer system;
   providing a console object configured to communicate with an operating system (OS) in a software platform of the computer system and the serial terminal driver;
   connecting to the console object through the serial port via a computer terminal, the console object providing a textual user interface (UI) of a console for interaction at the computer terminal;
   sending text and commands from the console object to the computer terminal; and
   rendering, by the computer terminal based on the text and the commands, the textual UI of the console for presentation on a display of the computer terminal.

9. The non-transitory computer readable medium of claim 8, wherein the step of sending comprises:
   positioning a cursor using one or more American National Standards Institute (ANSI) commands.

10. The non-transitory computer readable medium of claim 8, wherein the step of sending comprises:
    implementing at least one foreground or background color using one or more American National Standards Institute (ANSI) commands.

11. The non-transitory computer readable medium of claim 8, wherein the step of sending comprises:
    identifying the terminal emulator at the console object; and
    converting CP437 characters to ASCII characters or UTF8 characters depending on capabilities of the computer terminal.

12. The non-transitory computer readable medium of claim 8, wherein the step of sending comprises:
    double-buffering text to send only differences thereof.

13. The non-transitory computer readable medium of claim 8, wherein the step of sending comprises:
    scrolling using one or more American National Standards Institute (ANSI) commands.

14. detecting escape sequences received by the console object; and
    translating each of one or more of the escape sequences to a keyboard scan code.

15. A computing system, comprising:
    a hardware platform including a processor, memory, and a serial port; and
    a software platform executing on the hardware platform, the software platform including an operating system (OS), a serial terminal configured to interface the serial port, and a console object configured to communicate with the OS and the serial terminal driver, the software platform executable by the processor to:
        connect the console object to computer terminal through the serial port, the console object providing a textual user interface (UI) of a console for interaction at the computer terminal;
        send text and commands from the console object to the computer terminal.

16. The computing system of claim 15, wherein the software platform is executable by the processor to:

position a cursor using one or more American National Standards Institute (ANSI) commands.

17. The computing system of claim 15, wherein the software platform is executable by the processor to:
implement at least one foreground or background color using one or more American National Standards Institute (ANSI) commands.

18. The computing system of claim 15, wherein the software platform is executable by the processor to:
detect escape sequences received by the console object; and
translate each of one or more of the escape sequences to a keyboard scan code.

19. The computing system of claim 15, wherein the software platform is executable by the processor to:
double-buffer text to send only differences thereof.

20. The computing system of claim 15, wherein the software platform is executable by the processor to:
scroll using one or more American National Standards Institute (ANSI) commands.

* * * * *